(12) United States Patent
Charania

(10) Patent No.: US 10,176,273 B2
(45) Date of Patent: Jan. 8, 2019

(54) BIG DATA PARSER

(71) Applicant: Verizon Patent and Licensing Inc., Arlington, VA (US)

(72) Inventor: Aamer Charania, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 575 days.

(21) Appl. No.: 14/470,404

(22) Filed: Aug. 27, 2014

(65) Prior Publication Data

US 2016/0062794 A1 Mar. 3, 2016

(51) Int. Cl.
*G06F 17/30* (2006.01)

(52) U.S. Cl.
CPC .............. *G06F 17/30923* (2013.01)

(58) Field of Classification Search
None
See application file for complete search history.

(56) References Cited

U.S. PATENT DOCUMENTS

| | | | | |
|---|---|---|---|---|
| 2010/0262968 A1* | 10/2010 | Schumacher | ............. | G06F 8/10 718/102 |
| 2011/0302583 A1* | 12/2011 | Abadi | ............... | G06F 17/30545 718/102 |
| 2012/0254193 A1* | 10/2012 | Chattopadhyay | ............. | G06F 17/30979 707/747 |
| 2013/0346987 A1* | 12/2013 | Raney | ............. | G06F 9/5044 718/102 |
| 2015/0356123 A1* | 12/2015 | Gorelik | ............. | G06F 17/30297 715/765 |

OTHER PUBLICATIONS

Oozie, "Oozie Specification, a Hadoop Workflow System", v3.1, Dec. 3, 2012, http://oozie.apache.org/docs/3.3.0/WorkflowFunctionalSpec.html, accessed on Jan. 6, 2016.*

* cited by examiner

*Primary Examiner* — S. Sough
*Assistant Examiner* — Timothy P Duncan

(57) ABSTRACT

Computer-readable media include computer-readable instructions. The computer readable instructions include a class definition for a first object and a class definition for a second object. The first object includes a buffer for storing first information that identifies fields; a first function for storing the first information in the buffer; and a second function for extracting values of the fields, identified by the first information stored in the buffer, from a portion of a log. The second object includes a third function for obtaining configuration information from a configuration file, wherein the configuration information includes the first information; storing the configuration information at a first memory location; and performing a process.

2 Claims, 10 Drawing Sheets

```
<Configs>
<!--************** FIELDS TO EXTACT************ -->
    <field>
        <name>TimeStamp</name>
        <pattern>"_raw":"(\d{4}-\d{2}-\d{2} \d{2}:\d{2}:\d{2}?)</pattern>
        <required>false</required>
    </field>

<field>
        <name>TimeStampPosix</name>
        <pattern>"_time":"(.*?)"</pattern>
        <required>false</required>
    </field>

<field>
        <name>API</name>
        <pattern>\[API=(.*?)]</pattern>
        <required>false</required>
    </field>

<field>
        <name>TransactionID</name>
        <pattern>\[Transaction_ID=(.*?)]</pattern>
        <required>false</required>
    </field>

<field>
        <name>PartnerCustomerID</name>
        <pattern>\[Partner_Customer_ID=(.*?)]</pattern>
        <required>false</required>
    </field>

<field>
        <name>TransactionDeviceID</name>
        <pattern>TransactionDeviceID=(.*?),</pattern>
        <required>false</required>
    </field>
```

```xml
<!--*********** PROPERTIES TO EXTACT*********** -->
    <property>
        <name>debugMode</name>
        <value>false</value>
    </property>

<property>
        <name>addSource</name>
        <value>false</value>
    </property>

<property>
        <name>addOriginalRecordIfInvalid</name>
        <value>false</value>
    </property>

<property>
        <name>autoOutputPath</name>
        <value>false</value>
    </property>

<property>
        <name>numOfReducers</name>
        <value>-1</value>
    </property>

<property>
        <name>inputPath</name>
        <value>/user/acharania/parserTool/samllSampleLog.json</value>
    </property>

<property>
        <name>outputPath</name>
        <value>/user/acharania/out99</value>
    </property>
</Configs>
```

BIG DATA PARSER

BACKGROUND

Improvements in processing speeds of computational devices and increases in network bandwidths are fueling unprecedented growth in data collection and generation. For example, to support improved numerical/statistical analysis and weather prediction, weather stations may collect day-by-day and hour-by-hour meteorological data from around the globe. In another example, a computer security analyst may amass and store terabytes of communication data, extracted from the Internet for deep packet inspection.

BRIEF DESCRIPTION OF THE DRAWINGS

FIG. 8 depicts a portion of the exemplary configuration file of FIG. 5;

FIG. 9 depicts another portion of the configuration file of FIG. 5; and

DETAILED DESCRIPTION OF PREFERRED EMBODIMENTS

The following detailed description refers to the accompanying drawings. The same reference numbers in different drawings may identify the same or similar elements.

To analyze information using a big data framework (e.g., Hadoop, NoSQL, Massively Parallel Processing (MPP) database, MongoDB, etc.), a user may need to implement many software components for parsing data (herein referred to as "parsing modules" or "parsers"). For example, the user may need to filter different types of information from data using multiple parsing modules, where each module extracts a particular type of information from the data. In another example, requirements for mining information from data may continually change and demand new parser implementations. Unfortunately, implementing a parsing module can be burdensome, as it may involve writing code, testing and debugging the code, and creating an executable and/or portable image (e.g., Java archive (JAR) file).

In the following description, a log parser implemented as part of a big data system allows the user to specify parsing requirements in a document, and to avoid having to write, test, and debug code. The log parser may read the document and parse the data in accordance with the user requirements.

Figure 1:
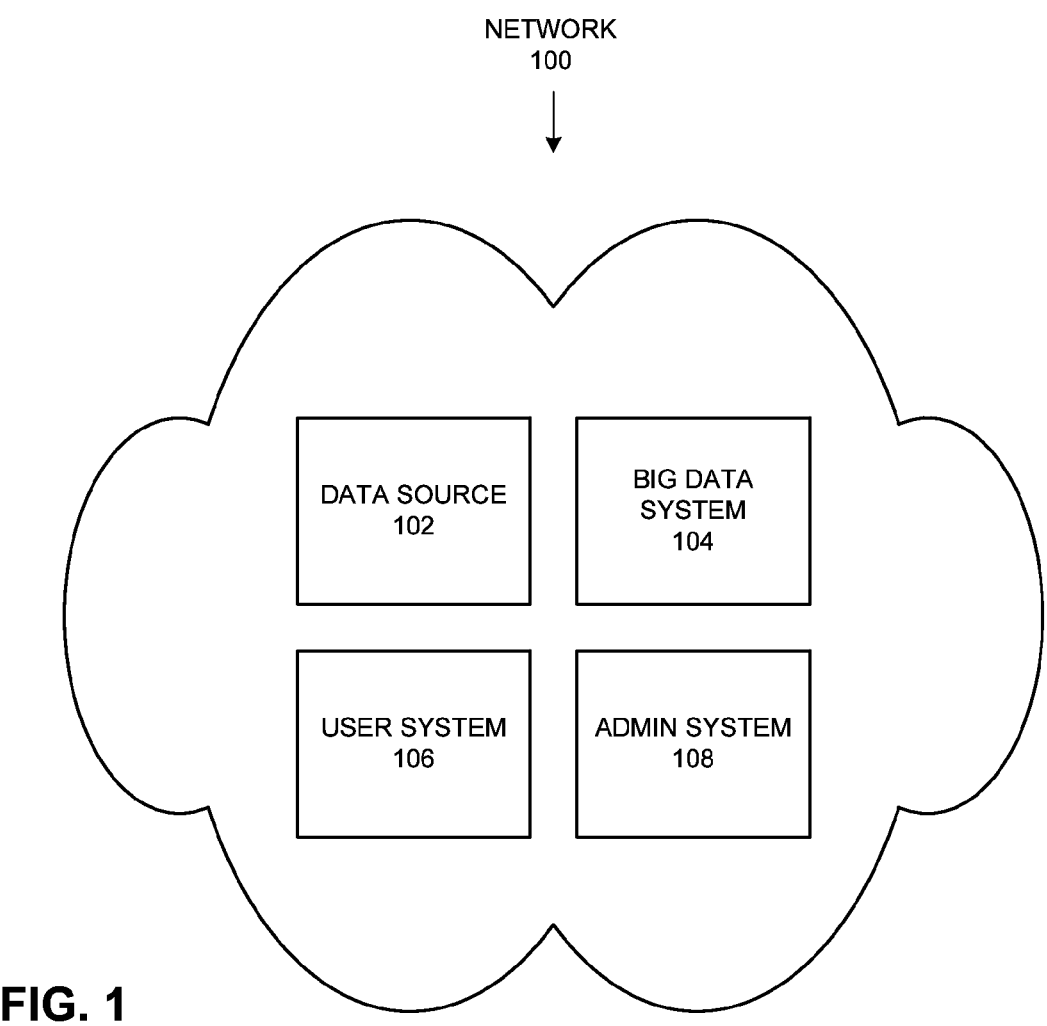
FIG. 1 illustrates an overview of an exemplary network in which concepts described herein may be implemented.

FIG. 1 illustrates an overview of an exemplary network 100 in which concepts described herein may be implemented. Network 100 may include the Internet, an intranet, a cloud network, a virtual private network (VPN), a software defined network (SDN), a service provider network, a local area network (LAN), a wide area network (WAN), a metropolitan area network (MAN), a cellular network, a public switched telephone network (PSTN), an optical network, an ad hoc network, any other type of network, or a combination of one or more networks.

Network 100 may include wired, optical, and/or wireless connections among its devices and systems. A connection may be direct or indirect and may involve an intermediary device, system, and/or an intermediary network not illustrated in FIG. 1. The number, type (e.g., wired, wireless, etc.), and the arrangement of connections between the devices, systems, and the network are implementation dependent.

A device, system, or node in network 100 may be implemented according to a centralized computing architecture, a distributed computing architecture, or a cloud computing architecture (e.g., an elastic cloud, a private cloud, a public cloud, etc.). Additionally, a device or system may be implemented according to one or multiple network architectures (e.g., a client device, a server device, a peer device, a proxy device, and/or a cloud device).

The number of devices, the number of systems, and the number of networks in network 100 are also implementation dependent. According to other embodiments, network 100 may include additional systems, fewer systems, and/or differently arranged systems than those illustrated in FIG. 1. For example, a single system in FIG. 1 may be implemented as multiple systems/devices and/or multiple systems may be implemented as a single system/device. For example, big data system 104 may be implemented as multiple devices, such as computers and external storage device, and user system 106 and administration system 108 may be combined into a single system or device. Also, according to other embodiments, one or more functions and/or processes described as being performed by a particular system may be performed by different systems or devices, or some combination of systems/devices.

As shown, network 100 may include a data source 102, big data system 104, user system 106, and administration system 108. Depending on the implementation, systems 102-108 may be implemented over non-intersecting or intersecting sets of devices. That is, a device in administration system 108 may also be part of big data system 104 and/or user system 106, for example.

Data source 102 may provide data to big data system 104. As used herein, the term "big data" refers to data characterized by large volume, velocity, and variety. In this context, volume refers to the size of data (e.g., terabytes, petabytes, exabytes, etc.); velocity refers to the rate at which the data is collected and/or processed; and variety refers to the number of different types of data (e.g., audio, video, text, image, hypertext markup language (HTML) document, etc.).

Depending on the implementation, data source 102 may or may not generate its own data. Additionally or alternatively, data source 102 may simply aggregate and direct data to big data system 104. Data source 102 may provide almost any form of information (e.g., network data (e.g., log files, sample packets, device performance data, health data, deep inspection data, etc.), content (e.g., video, audio, etc.), statistical data, genomic data, weather data, etc.

Big data system 104 may provide a framework for processing big data. In some implementations, big data system 104 may distribute data processing over a number computational devices, storage devices, and/or software systems.

User system 106 may include a user application (e.g., a client application or a browser) that provides an interface (e.g., graphical user interface (GUI), command console, etc.) to a user of big data system 104. Typically, a user application may be hosted on a client device. The user application may receive information from big data system 104, present the information to the user, receive user input, and relay the input to big data system 104.

Via a user application, a user may write code and implement a module for processing big data, compile and prepare the module for batch processing, run the module within big data system 104, configure the operational environment for running the module, subscribe to a service at big data system 104, unsubscribe to the service, make a payment for use of big data system 104, set user preferences, etc.

Administration system 108 may include an administration application (e.g., a client application or a browser) that provides an interface (e.g., GUI, console, etc.) to an administrator or an operator of big data system 104. Typically, an administration application may be hosted on a client device. The administration application may receive information from big data system 104, present the information to an administrator, receive administrator input, and relay the administrator input to big data system 104.

Via an administration application, an administrator may set operational policies for dividing an amount of work into smaller portions to be performed over multiple devices, set configuration parameters for failover conditions, input/remove/edit rules for rendering services to users, create an account, give permissions to users for performing specific tasks, give a user access to devices, etc. An administration application may also allow the administrator to set alarms, configure a reporting service (e.g., email service, texting service, etc.), specify reporting a format, etc.

Figure 2:
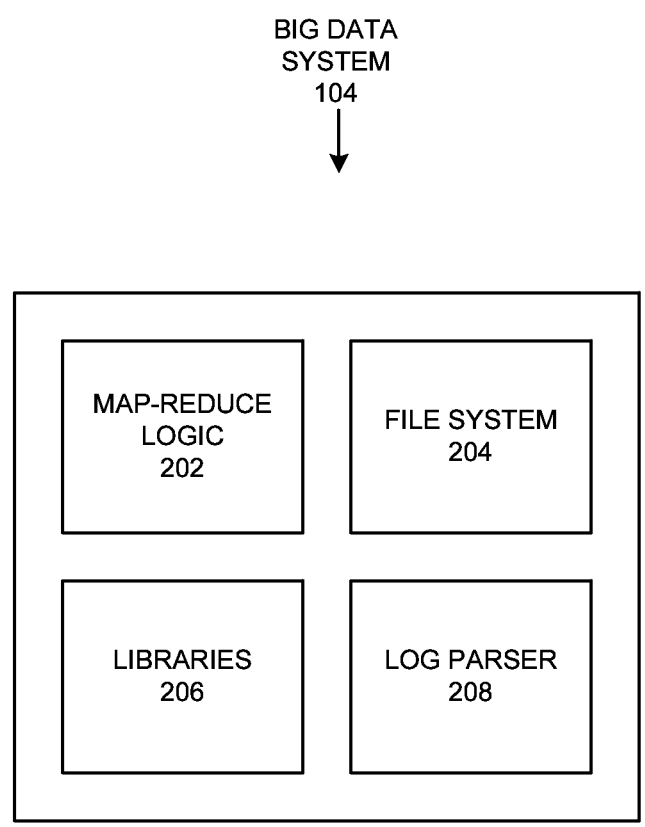
FIG. 2 is a block diagram that depicts exemplary functional components of the exemplary big data system of FIG. 1.

FIG. 2 is a block diagram that shows exemplary functional components of big data system 104. As shown, big data system 104 may include map-reduce logic 202, file system 204, libraries 206, and log parser 208. Depending on the implementation, big data system 102 may include additional, fewer, and/or different components than those illustrated in FIG. 2.

Map reduce logic 202 may include software and/or hardware components for dividing a big data set into smaller pieces of data, distributing the pieces over multiple device (herein refereed to as "slave devices"), running functions/methods for parsing logs on the devices, obtaining results from the devices, and presenting the result to the user.

File system 204 may include one or more devices as well as a file system that overlays the devices. File system 204 may be fail-safe (e.g., retains multiple copies of data) and provides an infrastructure for distributed processing of big data.

Libraries 206 may include software modules (e.g., class libraries) and their application programming interfaces (APIs) for implementing a user defined mapper or reducer logic. For example, log parser 208 may include code that uses classes that are defined in libraries 206. In some implementations, libraries 206 may include Java classes. For example, libraries 208 may include Java classes that belong to Apache Hadoop™ projects, such as Hive (a data warehouse infrastructure), Mahout™ (scalable data mining classes), Pig™ (a high-level Structured Query Language (SQL)-like language), etc.

Log parser 308 may include modules for parsing logs. As used herein, the term "log" or "log file" may refer to a file that includes records of events in a computing environment. A log file may include, for example: a Syslog (e.g., messages sent by different subsystems of an operating system); a transaction log (record of financial or other types of transactions); a message log (e.g., record of messages (e.g., text messages)); etc. In some implementations, each record in a log file may include a timestamp.

Figure 3:
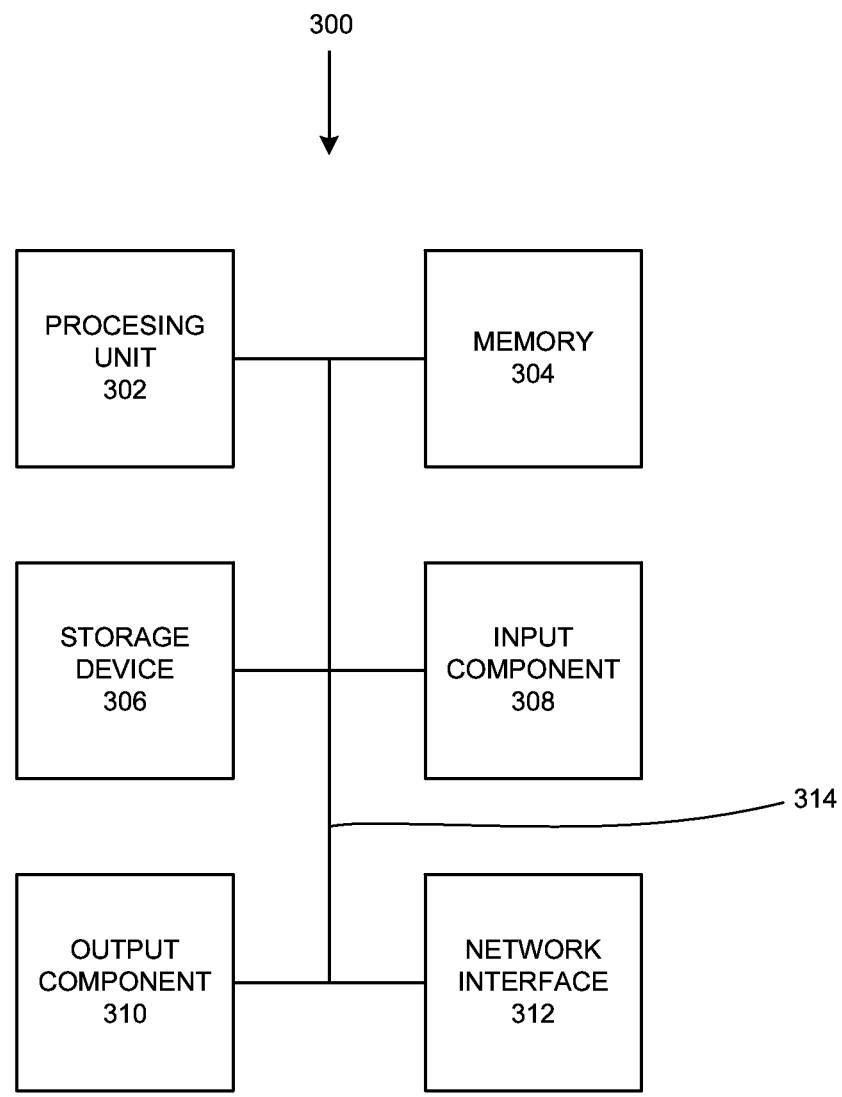
FIG. 3 illustrates exemplary components of the network devices of FIGS. 1 and 2.

FIG. 3 is a block diagram of exemplary components of a network device 300. Network device 300 may correspond to one more devices on which any of systems 102-108 in network 100, logic 202, file system 204, libraries 206, and log parser 208 may be implemented. As shown, network device 300 may include a processing unit 302, memory 304, storage unit 306, input component 308, output component 310, network interface 312, and communication path 314. In different implementations, network device 300 may include additional, fewer, different, or different arrangement of components than the ones illustrated in FIG. 3. For example, network device 300 may include line cards for connecting to external buses.

Processing unit 302 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling device 300 and/or executing programs/instructions.

Memory 304 may include static memory, such as read only memory (ROM), and/or dynamic memory, such as random access memory (RAM), or onboard cache, for storing data and machine-readable instructions (e.g., programs, scripts, etc.).

Storage unit 306 may include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Storage unit 306 may be external to and/or removable from network device 300. Storage unit 306 may include, for example, a Universal Serial Bus (USB) memory stick, a dongle, a hard disk, off-line storage, a Blu-Ray® disk (BD), etc. Storage unit 306 may store data, a copy of software, an operating system, application, and/or instructions.

Depending on the context, the term "memory," "storage," "storage device," "storage unit," and/or "medium" may be used interchangeably. For example, a "computer-readable storage device" or "computer-readable medium" may refer to both a memory and/or storage device. Typically, these devices are non-transitory and may store persistent data.

Input component 308 and output component 310 may provide input and output from/to a user to/from device 300. Input/output components 308 and 310 may include a display screen, a keyboard, a mouse, a speaker, a microphone, a camera, a DVD reader, USB lines, and/or other types of components for converting physical events or phenomena to and/or from signals that pertain to device 300.

Network interface 312 may include a transceiver (e.g., a transmitter and a receiver) for network device 300 to communicate with other devices and/or systems. For example, via network interface 312, network device 300 may communicate over a network, such as the Internet, an intranet, a terrestrial wireless network (e.g., a WLAN, WiFi, WiMax, etc.), a satellite-based network, optical network, etc. Network interface 312 may include a modem, an Ethernet interface to a LAN, and/or an interface/connection for connecting device 300 to other devices (e.g., a Bluetooth interface).

Communication path 314 may provide an interface through which components of network device 300 can communicate with one another.

Network device 300 may perform the operations described herein in response to processing unit 302 executing software instructions stored in a non-transient computer-readable medium, such as memory 304 or storage device 306. The software instructions may be read into memory 304 from another computer-readable medium or from another device via network interface 312. The software instructions stored in memory 304 or storage device 306, when executed by processing unit 302, may cause processing unit 302 to perform processes that are described herein.

Figure 4:
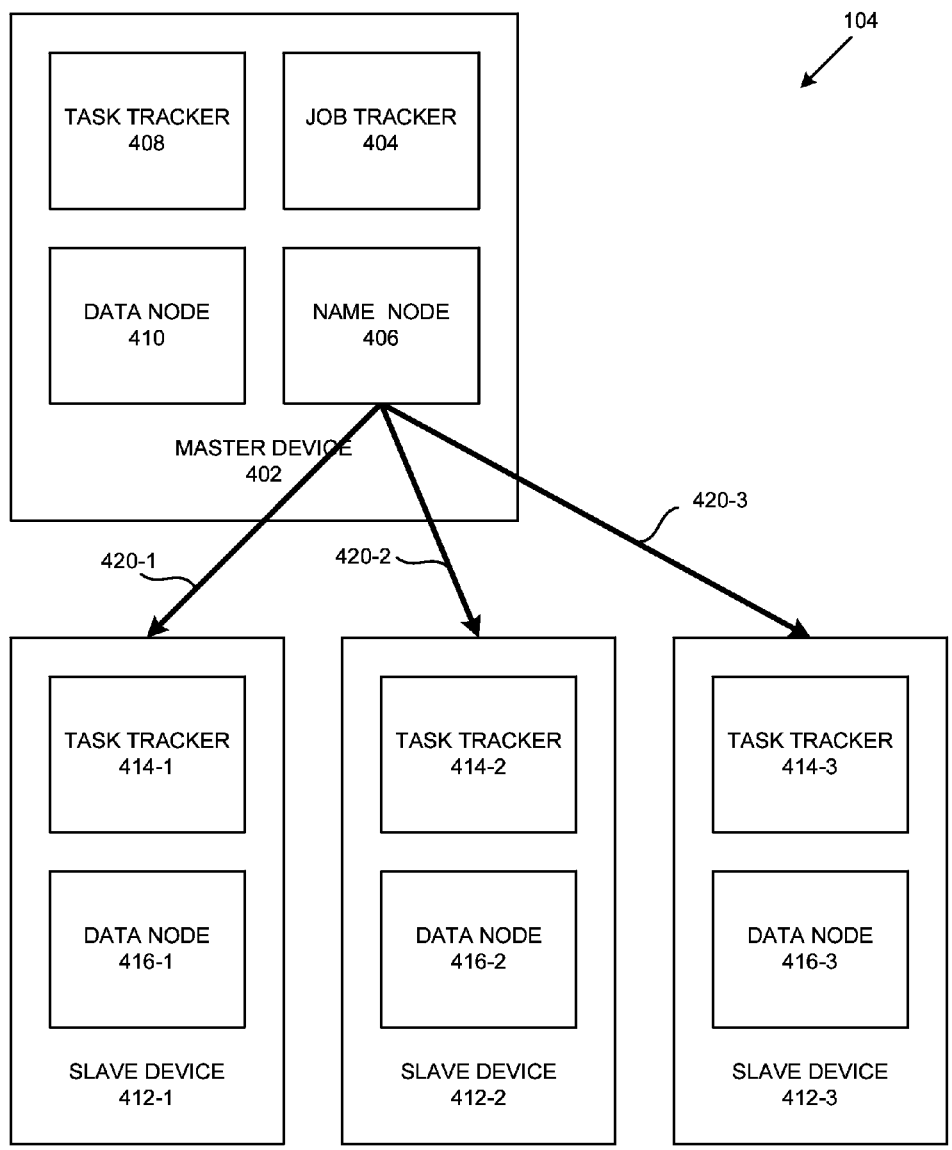
FIG. 4 illustrates exemplary functional components of the big data system of FIG. 1 when the exemplary map reduce logic performs an exemplary job.

FIG. 4 illustrates exemplary functional components of big data system 104 when map reduce logic 202 performs an exemplary job. As shown, big data system 104 may include a master device 402 and slave devices 412-1, 412-2, and 412-3. Depending on the implementation and configuration, big data system 104 may include fewer or additional slave devices than those illustrated in FIG. 4.

As shown, master device 402 may include a job tracker 404 and a name node 406. Job tracker 404 may: receive a job request from a client; divide the job into smaller, concurrent tasks; assign each of the tasks to a slave device (e.g., slave 412-1, 412-2, or 412-3); monitor the tasks; coordinate the progress of each of the tasks; and aggregate the results of the tasks. For example, job tracker 404 may receive a request for parsing logs from a log parser 208 instance, divide the job into tasks (e.g., parsing a single log file or a portion of a log file), assign each of the tasks to slave devices 412-1, 412-2, and 412-3, and aggregate the results of parsing the log files from slave devices 412-1 through 412-3.

As used herein, the terms "map," "map task", "map function," "mapping function," and/or another similar term may refer to a task that a master device assigns to a slave device. Further, as used herein, the terms "reduce task," "reduce function," "reducer function," "reducer task," and/or another similar term may refer to a program/method for aggregating the results, of the tasks, from slave devices.

Name node 406 manages storage of data on different slave devices. Name node 406 may include information that maps which data resides on which slave device (e.g., which log file resides on what slave device).

As further shown, each slave device 412 may include a task tracker 414 (one of 414-1, 414-2, or 412-3) and a data node 416 (one of 416-1, 416-2, or 416-3). Task tracker 414 may receive a request to perform a task, such as parsing a log file or a portion of a log file. In response to the request, task tracker 414 may execute the task. While executing the task, task tracker 414-1 may monitor the task's progress and report the progress to job tracker 404. Data node 416 may include one or more blocks of data. For example, data node 416 may include one or more log files.

In FIG. 4, master device 402 may manage slave devices 412-1, 412-2, and 412-3. The hierarchical relationship between the devices is indicated via arrows 420-1, 420-2, and 420-3. In some implementations, master device 402 may also function as one of slave device, as shown by the inclusion of task tracker 408 and data node 410 in mater device 402.

Figure 5:
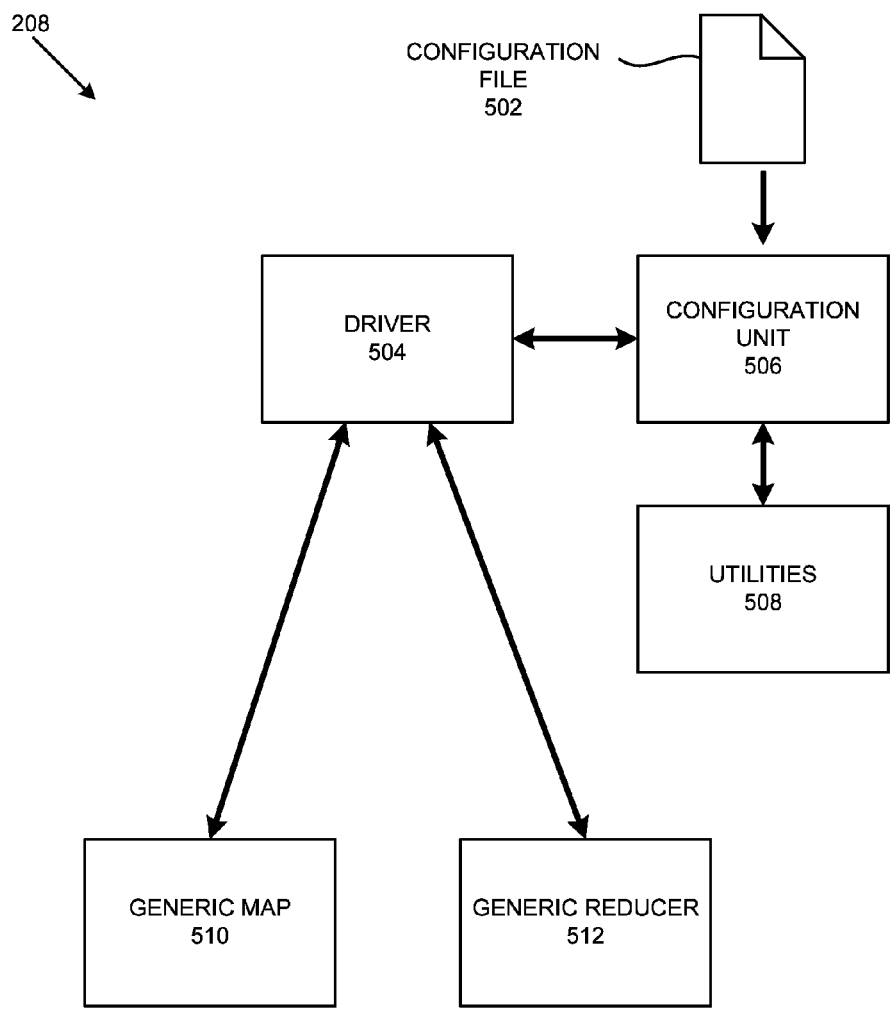
FIG. 5 depicts exemplary functional components of the exemplary log parser of FIG. 2.

FIG. 5 depicts exemplary functional components of log parser 208. As shown, log parser 208 may include a configuration file 502, driver 504, configuration unit 506, utilities 508, generic map 510 (also referred to as "generic map module," "generic mapper class," or "generic map class"), and generic reducer 512 (also referred to as "generic reducer module," "generic reducer class" or "generic reduce class"). Depending on the implementation, log parser 208 may include additional, fewer, different, or a different arrangement of components than those illustrated in FIG. 5. For example, log parser 208 may include multiple configuration files 502.

Configuration file 502 (also referred to as "parse configuration file") may include information that specifies a list of fields and properties that log parser 208 is to detect within log files. When log parser 208 identifies, within log files, the fields and properties specified in configuration file 502, log parser 208 may write the field name-value pairs and property name-value pairs to an output device or medium (e.g., file, web page, mail, etc.). In one implementation, configuration file 502 may include an extensible markup language (XML) document. In other implementations, configuration file 502 may include a document or a file in another language or format.

Driver 504 may include the entry point for a big data process for parsing log files. When a user runs the member methods/functions of driver 504, the methods/functions of driver 504 may: call the member functions/methods of configuration unit 506; provide class definitions for a generic map class and a generic reducer class (which are included in log parser 208) to a log parsing job; and submit the log parsing job to big data system 104 via-map-reduce logic 202. Thereafter, map-reduce logic 202 may function in accordance with FIG. 4, with each task corresponding to the map function implemented within a user-implemented map class.

Configuration unit 506 may include logic for reading configuration file 502. For example, when configuration file 502 is an XML file, a member function/method of configuration unit 506 may invoke an XML reader to scan configuration file 502. Subsequently, configuration unit 506 may determine a list of field-value pairs that are to be extracted from logs and property-value pairs to be used while parsing the logs.

Utilities 508 may include one or more modules, classes, and/or other software components that are used within configuration unit 506 via their APIs. For example, in one implementation, utilities 508 may include a hash table class, an XML reader class, a document class, stream classes, input and output classes, exception classes, etc.

Generic map 510 may include a map function or map method. When job tracker 404 assigns a log parsing task (i.e., part of a log parsing job) to a slave device 412, slave device 412 may invoke the map function to accomplish the task.

Generic reducer 512 may include a reduce function. When slave devices 412 complete their tasks, job tracker 404 may invoke the reduce function to aggregate the results of the completed tasks.

Figure 6:
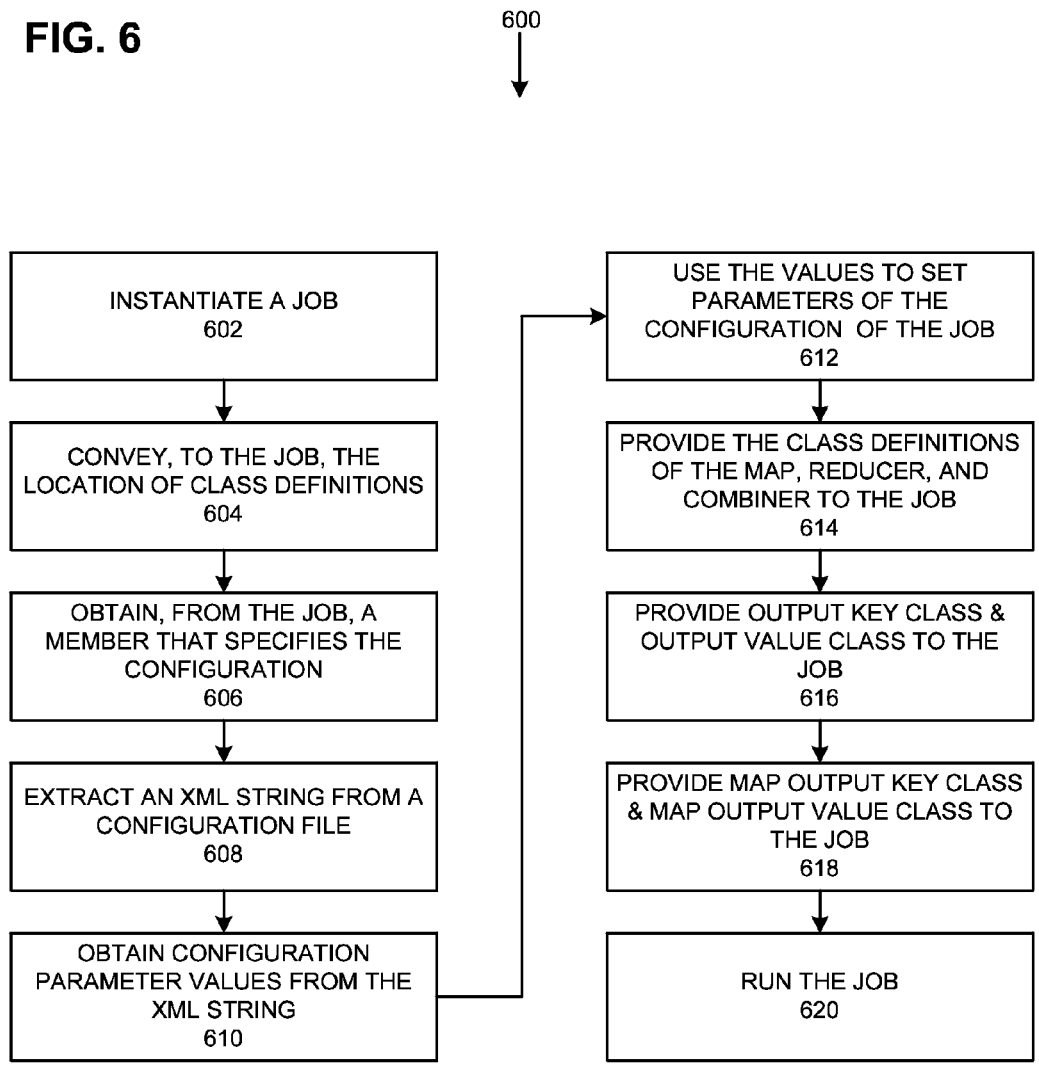
FIG. 6 shows a flow diagram of an exemplary process performed by an exemplary member function/method of the exemplary driver of FIG. 5.

FIG. 6 shows a flow diagram of an exemplary process 600 performed by a member function/method of driver 504. In the following, depending on the context, the term "driver 504" may refer to either the member function of driver 504 or to driver 504. As shown, process 600 may include instantiating a job object (block 602). In some implementations, a job class specifies function/method definitions for instantiating a job object, as well as definitions for assigning and scheduling tasks to slave devices 412. In such implementations, the job object's members may store information needed for performing the functions/methods of the job class. In other implementations, rather than instantiating a job object, process 600 may allocate a piece of dynamic memory from free space and write, to the allocated memory, information needed for scheduling and/or assigning tasks to slave devices 412.

Driver 504 may convey, to the instantiated job object, information identifying the location (e.g., address) at which definitions of certain classes are stored (e.g., map class, reducer class, etc.) (block 604). In one implementation, driver 504 may convey the location of a Java Archive (JAR) file that includes the class definitions, by specifying the class name of driver 504. In other implementations, process 600 may pass the addresses of functions/methods that are associated with assigning tasks to different slave devices.

Driver 504 may obtain, from the newly instantiated job object, a reference to a member object that specifies the configuration of the job object (block 606). The purpose behind obtaining the reference is to store configuration information (to be obtained from parse configuration file) in the configuration object within the job object. This information may be used later by map-reduce logic 202 for task management. In other implementations, such information may be stored in a lookup table, persistent storage, array, etc.

Driver 504 may extract an XML string from a parse configuration file (block 608). In one implementation, driver 504 may receive a location information associated with the parse configuration file (e.g., the name of the directory in which the configuration file can be found) and read the parse configuration file into a string object. That is, the string object, which results from performing actions that are associated with block 608, includes the contents of the parse configuration file. In a different implementation, the parse configuration file may be read directly into a byte array or an integer buffer. The values stored in the array/buffer may then be converted into a string.

Driver 504 may obtain values of configuration parameters, for the parsing job/tasks, from the XML string (block 610). In one implementation, driver 504 may invoke a member function/method of configuration unit 506. The member function/method of configuration unit 506 is described below with reference to reference to FIG. 7.

Driver 504 may use the values of the configuration parameters to set the values for the parameters of the configuration object of the job object (block 612). In some implementations, the parameter values may indicate, for example: whether the parsing job is to be run in a debug mode; whether an output file should include an address of the source of a log file that is parsed; whether a portion of the log file should be included in the output when the portion includes an invalid log record; the number of reducers; the output path; the input path; etc.

Driver 504 may provide information identifying the definitions of a map class, reducer class, and combiner class to the job object (block 614). For example, driver 504 may provide information identifying the generic map 510 class, generic reducer 512 class, and a combiner class, to the job object. During its execution of a job/tasks, big data system 104 may use the information to find and load the class definitions for generic map 510, generic reducer 512, and the combiner at the location specified at block 604. The class definitions of map 510, reducer 512, and the combiner are needed to call the map function, the reduce function, and a combiner function.

Driver 504 may provide, to the job object, information identifying the class definitions of the key-value pairs that are to be output when the log parsing job is performed (block 616). In addition, driver 504 may provide, to the job object, information identifying the class definitions of the key-value pairs that are to be output when the map function executes (block 618). The job object may store the information until the information is needed to provide the outputs.

Driver 504 may start the log parsing job (block 620). Initiating the parsing job causes job tracker 404 on a master device 402 to generate and distribute tasks to slave devices 412. Each task may include performing the map function. Once the tasks have been completed, each of task trackers 414 on slave devices 412 may run a combiner function and provide a result to job tracker 404. Job tracker 404 may then run the reducer function, to combine the results.

Figure 7:
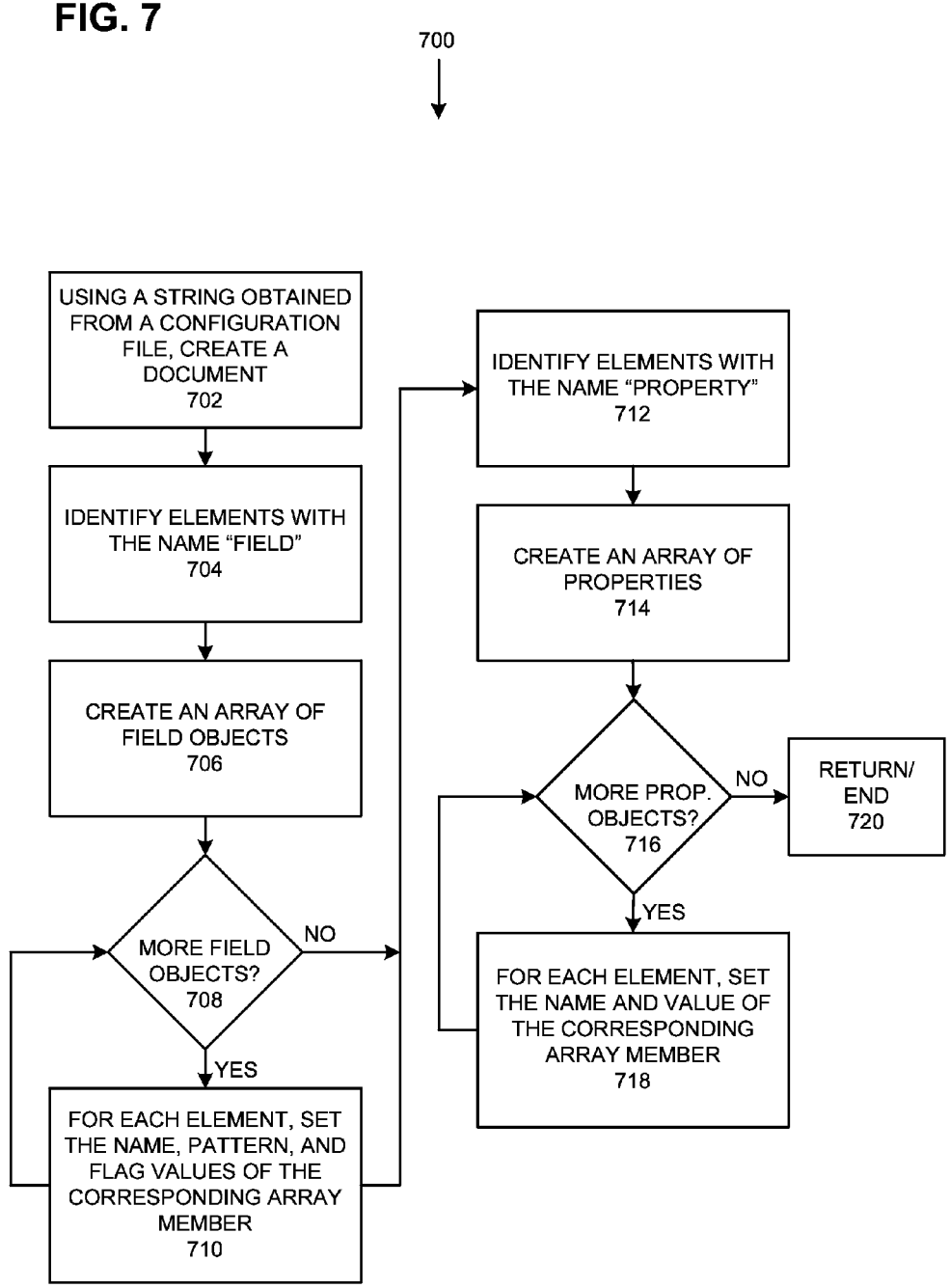
FIG. 7 shows a flow diagram of an exemplary process performed by an exemplary member function/method of the configuration unit of FIG. 5.

FIG. 7 shows a flow diagram of an exemplary process 700 performed by an exemplary member function/method of configuration unit 506. As described above, driver 504 may invoke the member function/method of configuration unit 506 at block 610 to obtain the values of the configuration parameters from an XML string. In the following, depending on the context, the term "configuration unit 506" may refer to either the member function/method of configuration unit 506 or to configuration unit 506.

As shown, process 700 may include: obtaining a string from a parse configuration file (e.g., configuration file 502); and creating a document based on the string (block 702). For example, configuration unit 506 may provide the XML string (obtained at block 608) as an input to a class constructor for an XML document object.

FIGS. 8 and 9 depict portions 800 and 900 of parse configuration file 502 according to one implementation. As shown, portion 800 includes six field elements, where each field element has <field> tag and a corresponding </field> closing tag. Furthermore, each field element includes: a name element with <name>/</name> tags; a pattern element with <pattern>/</pattern> tags; and a required element with <required>/</required> tags. A name element provides a name of the field; a pattern element provides a pattern (to be found in the logs) as a regular expression; and a required element provides a Boolean value indicating whether the logs must include a field corresponding to the field element.

As already discussed above, at block 608, extracting a string from configuration file 502 entails reading configuration file 502 and copying its contents (i.e., portions 800 and 900) as a single string. In contrast, creating a document object entails reading the string, identifying tags within the string, and creating element objects (in the document object). Each element object corresponds to the elements in portions 800 and 900 of configuration file 502.

Configuration unit 506 may identify field element objects, in the document object (block 704). To identify the field element objects, configuration unit 506 may find element objects, within the document object, whose name matches the string "field." In an implementation consistent with FIGS. 8 and 9, because the document object is created from an XML document (i.e., portions 800 and 900 of configuration file 502), each field element object of the document object includes child element objects that correspond to the name element, the pattern element, and the required element in portion 800. The name element indicates the name of the field element; the pattern element includes a string representing the pattern of the field; and the required element includes a Boolean flag. The value of the flag may indicate whether the field is optional within a log.

Configuration unit 506 may create an array of field objects (block 706). The number of the field objects of the array is equal to the number of field element objects found in the document object at block 704. In addition, each field object of the array includes, as its member, a name string, a pattern string, and a Boolean flag. These members represent the values of the name element object, pattern element object, and required element object of the corresponding field element object.

Configuration unit 506 may determine if the values of each of the element objects identified at block 704 have been copied to a field object in the array created at block 706 (block 708). If there are no more field element objects whose values are to be copied to a field object (block 708: no), configuration unit 506 may proceed to block 712. If there is another element object whose values should be copied to the corresponding field object (block 708: yes), configuration unit 506 may proceed to block 710, to copy the values of the name, the pattern, and the required element objects to the name, the pattern, and the flag of the corresponding field object (block 710).

Configuration unit 506 may identify property element objects in the document object (block 712). To identify the property element objects, configuration unit 506 may find element objects, within the document object, whose name matches the string "property." In an implementation consistent with FIGS. 8 and 9, because the document object is created from an XML document (i.e., portions 800 and 900 of configuration file 502), each property element object of the document includes child element objects that correspond to the name element and the value element in portion 900. The name element indicates the name of the property element; and the value element includes a value of the property element. The value of the flag indicates whether the field is optional within a log.

Configuration unit 506 may create an array of property objects (block 714). The number of the newly created array of property objects is equal to the number of property element objects found within the document at block 712. In addition, each member of the array of property objects includes, as its member, a name string and a value. These members represent the values of the name element object and the value element object of the corresponding property element object.

Configuration unit 506 may determine whether the values of each of the element objects identified at block 712 have been copied to a property object in the array created at block 714 (block 716). If there are no more property element object whose values are to be copied to the property object (block 716: no), configuration unit 506 may proceed to block 720, to return to the calling program/function. If there is another element object whose values are to be copied to the corresponding property object (block 716: yes), configuration unit 506 may proceed to block 718 to copy the values of the name and value element objects to the name and value fields of the corresponding property object (block 718). Process 700 may then return to block 716.

Figure 10:
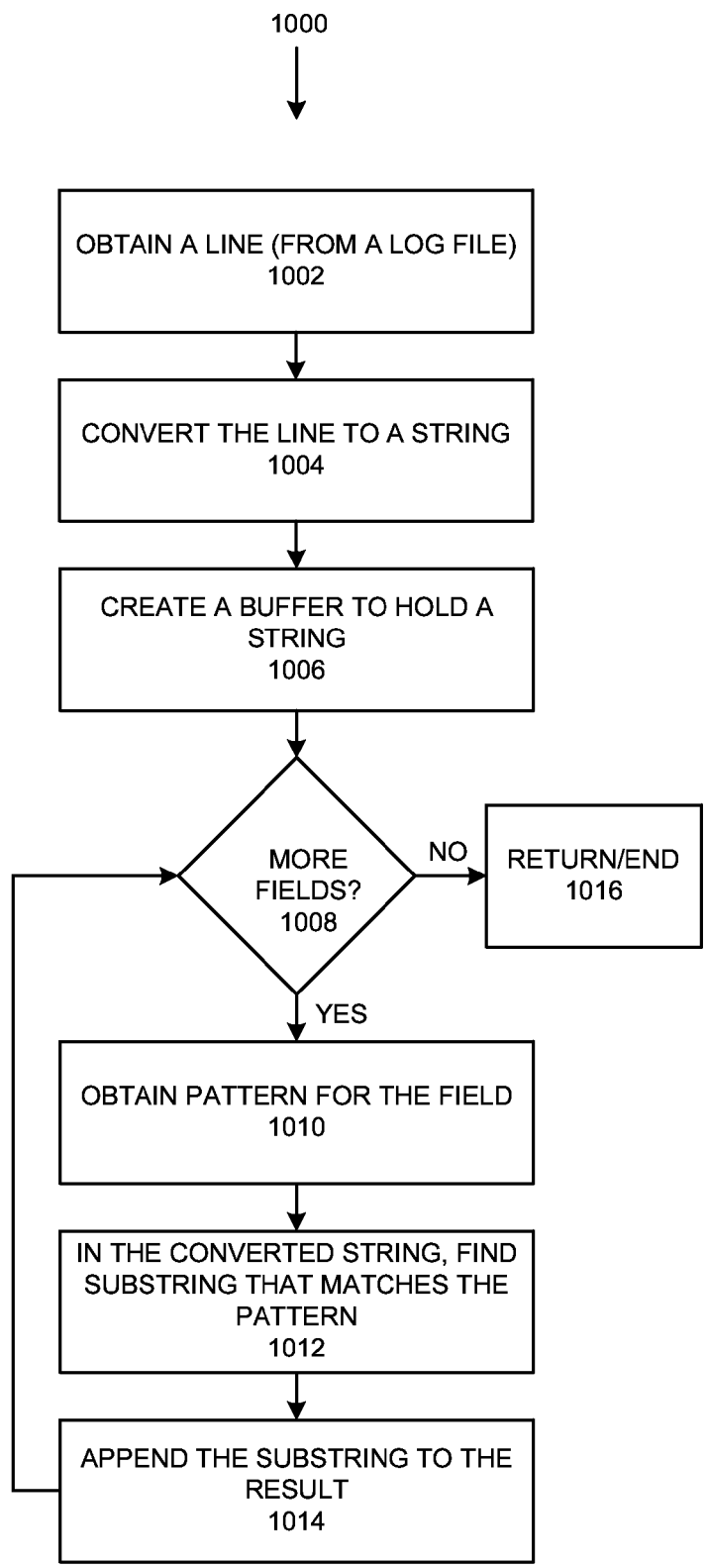
FIG. 10 shows a flow diagram of an exemplary process that is performed by an exemplary member function/method of the generic map of FIG. 5.

FIG. 10 shows a flow diagram of an exemplary process 1000 performed by a member function/method of generic map 510. In the following, depending on the context, the term "generic map 510" may refer to either a member function/method of generic map 510 or to generic map 510. After tasks are distributed over slave devices 412, each task tracker 414 may invoke the function (of generic map 510) corresponding to process 1000 to perform its parsing task over log files.

Before process 1000 is ready to begin executing at different slave devices 412, however, an array of field objects (the same class of field objects created at block 706) needs to be instantiated and initialized, and therefore available for use by generic map 510. Depending on the implementation, a setup member function/method for generic map 510 may perform the field object instantiation and initialization prior to the execution of the map function. In another implementation, the array of field objects may be created as static objects, via a static method. Such a static method would be automatically executed before the execution of non-static methods.

As shown, process 1000 may include obtaining a line from a log file (block 1002). The log file may include plain text. Thereafter, generic map 510 may convert the line into a string (block 1004).

Generic map 510 may create a buffer (i.e., allocate a buffer) to hold a string (block 1006). The buffer is initially filled with a null string. At block 1008, generic map 510 may determine whether there is a field object (among the field objects created prior to the execution of process 1000) which has not yet been used for parsing the line (block 1008). If there is no additional field object (block 1008: no), generic map 510 may go to block 1016, to return to the process waiting for process 1000 to terminate.

If there is yet another field object that is to be used for parsing the converted string (block 1008: yes), generic map 510 may select the field object and access its pattern field to obtain a pattern (block 1010). If the content of the pattern field is a regular expression, the regular expression may be compiled to generate a compiled pattern.

Generic map 510 may use the pattern (compiled or not) to identify, within the string converted from the line at block 1004, a substring with the same pattern (block 1012). If the substring exists, the substring may be appended to the string stored in the buffer (block 1014). If no string is stored in the buffer, the substring may be copied into the buffer. Thereafter, process 1000 may return to block 1008.

This specification describes a log parser that allows the user to specify parsing requirements in a document, and to avoid having to write, test, and debug code. The log parser may read the document and parse the data in accordance with the requirements.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while a series of blocks have been described with regard to the processes illustrated in FIGS. 6, 7, and 10, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, block, or instruction used in the present application should be construed as critical or essential to the implementations described herein unless explicitly described as such. Also, as used herein, the articles "a", "an" and "the" are intended to include one or more items. Further, the phrase "based on" is intended to mean "based, at least in part, on" unless explicitly stated otherwise.

To the extent the aforementioned embodiments collect, store or employ personal information provided by individuals (e.g., during a subscription to big parser services), it should be understood that such information shall be used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

What is claimed is:

1. A system comprising:
   a map module, implemented in hardware, comprising:
   a buffer to store first information that identifies fields;
   a first function to store the first information in the buffer;
   a second function to extract values of the fields, identified by the first information stored in the buffer, from a portion of a log;
   a driver module, implemented in hardware, comprising a third function to:
   obtain configuration information from a configuration file, wherein the configuration information includes the first information;
   store the configuration information at a first memory location;
   create a job object;
   store, in the job object, an address of a memory location at which the map module is stored; and
   perform a process to:
   obtain the first information from the configuration information;
   store the obtained first information in the buffer;
   divide a log parsing job into two or more tasks, wherein each of the tasks includes executing the second function at a different slave device; and
   cause the slave devices to execute the tasks,
   wherein the configuration information includes information that is different from the first information.

2. A first method comprising:
   a second method for storing first information that identifies fields in a buffer;
   a third method for extracting values of the fields, identified by the first information stored in the buffer, from a portion of a log; and
   a fourth method for:
   obtaining configuration information from a configuration file, wherein the configuration information includes the first information;
   storing the configuration information at a first memory location;
   creating a job object;
   storing, in the job object, an address of a memory location at which a class definition of an object that includes the fourth method is stored; and
   performing a process for:
   obtaining the first information from the configuration information;
   storing the obtained first information in the buffer;
   dividing a log parsing job into two or more tasks, wherein each of the tasks includes executing the third method at a different slave device; and
   causing the slave devices to execute the tasks,
   wherein the configuration information includes information that is different from the first information.

* * * * *